Feb. 28, 1933.   O. W. OTT ET AL   1,899,523
WATER HEATER
Filed Jan. 26, 1931
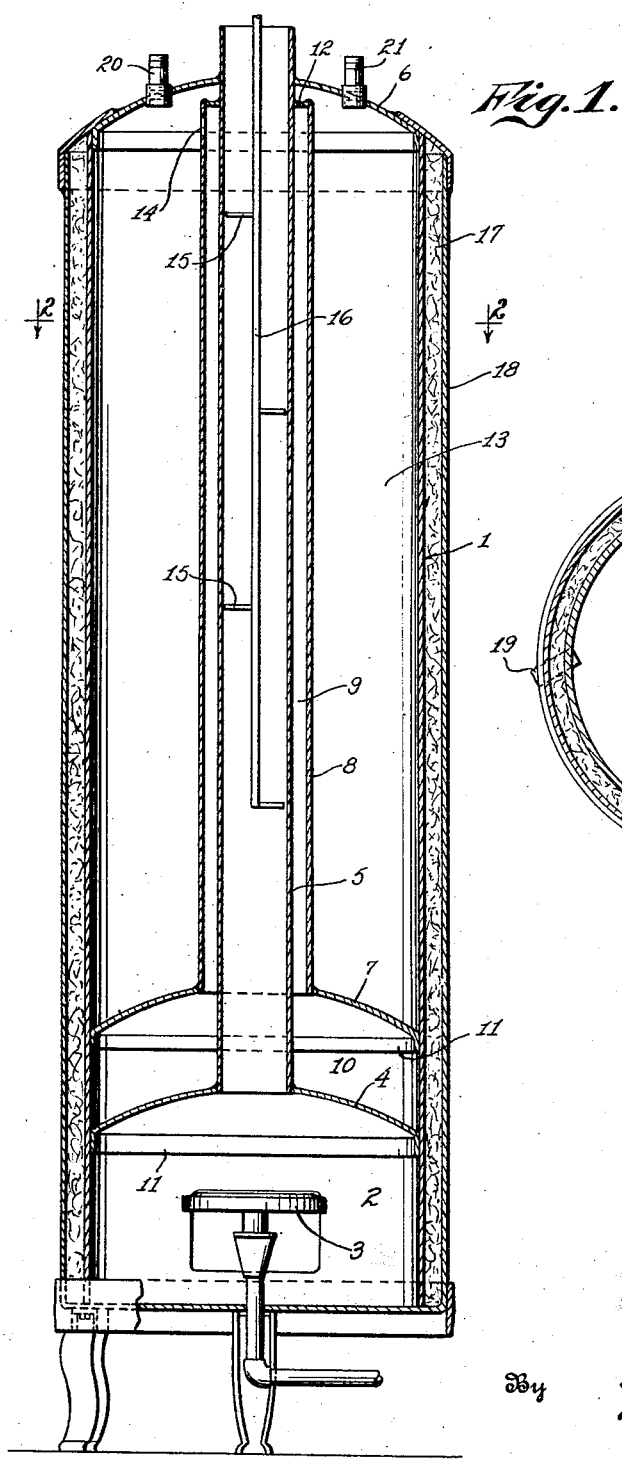
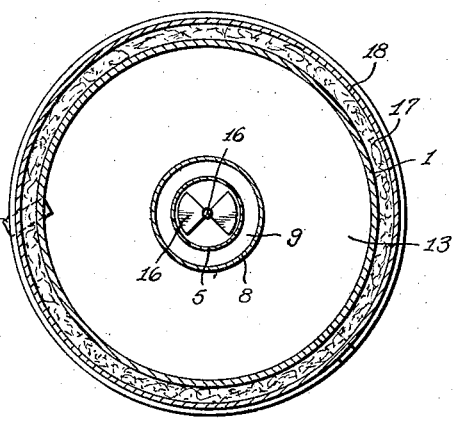
Inventors
Oran W. Ott,
Arthur J. Smithers,
By Lyon+Lyon
Attorneys Patented Feb. 28, 1933

1,899,523

REISSUED

UNITED STATES PATENT OFFICE

ORAN W. OTT, OF LOS ANGELES, AND ARTHUR J. SMITHERS, OF ALHAMBRA, CALIFORNIA, ASSIGNORS TO PACIFIC PIPE AND SUPPLY COMPANY, OF LOS ANGELES, CALIFORNIA, A CORPORATION OF CALIFORNIA

WATER HEATER

Application filed January 26, 1931. Serial No. 511,253.

This invention relates to water heaters and particularly to domestic water heaters. In localities where the water contains lime compounds there is considerable difficulty in operating heaters, particularly heaters of the coil type because of the deposit of sulphate or carbonate of lime on the interior of the coil. This deposit or scale materially interferes with the efficiency of the heater in transferring heat to the service water being heated and also materially reduces the effective cross section of the coil, thereby diminishing the amount of water that can flow through the heating coil for delivery at the point where the hot water is to be used. It has been found that the deposits from hard water are greatly increased with the temperature of the plate or surface that is heating the water. In other words, a considerable deposit occurs where a flame or hot gases are located on one side of the heating wall and the water being heated is in contact with the other side of the heating wall.

It has been attempted to overcome these difficulties by constructing a heater with trapped water which comes in contact with the wall that is highly heated by the fire and this trapped water is utilized as a transfer medium for transferring the heat to the service water. In this way the deposit of lime or similar compounds in the service water chamber is greatly reduced. However, if the trapped water is completely confined it may develop a considerable pressure and this would necessitate a substantial increase in the thickness of the plates confining the trapped water.

The general object of this invention is to provide a heater of simple construction which will overcome these difficulties and which is particularly adapted for heating hard waters; also to provide a heater of this type which will be highly efficient in operation and which is so constructed as to maintain equilibrium between the pressure of the trapped water and the service water chamber in which the service water is being heated but without necessitating a constant change in the trapped water. In other words, water is substantially trapped and is substantially free from replacement by the service water. In this way the deposits in the trapping chamber are greatly reduced.

A further object of the invention is to provide a heater which can be constructed at a low cost which will be efficient in transferring heat to the service water but in which the deposits from the hard water will be reduced to a minimum.

Further objects of the invention will appear hereinafter.

The invention consists in novel parts and combinations of parts to be described hereinafter, all of which contribute to produce an efficient water heater.

A preferred embodiment of the invention is described in the following specification, while the broad scope of the invention is pointed out in the appended claims.

In the drawing:

Figure 1 is a vertical section through a heater embodying our invention with certain parts broken away.

Figure 2 is a horizontal section taken about on the line 2—2 of Figure 1.

Referring more particularly to the parts, in constructing the heater we provide a shell 1 preferably of cylindrical form in an upright position, the lower end of the said shell being utilized to form a fire box 2 provided with means for developing heat, for example, a gas burner 3. The upper side of the fire box 2 is nearly closed by a fire box head 4, with a central opening carrying a flue 5 preferably of tubular form that extends upwardly and passes through the upper head 6 of the shell 1. Over the fire box head 4 is a water head 7 which is formed with a central opening carrying a tubular jacket 8 that surrounds the flue 5 and cooperates with the same to form an annular relatively narrow water jacket 9 communicating with the water space 10 that is formed between the heads 4 and 7. The heads 4 and 7 are preferably made of sheet metal and crowned in an upward direction so that their convex sides are disposed upwardly. They are formed with flanges 11 that may be welded to the inner side of the shell 1.

The tubular jacket 8 extends up to an elevated point in the tank or shell 1 and is preferably secured to an annular head or collar 12 secured to the flue just below the head 6. Preferably at an elevated point so as to be remote from the ebullition point in the heater we provide means of communication between the water jacket space 9 and the service water space 13 that is formed within the shell 1 and around the jacket 8. This may be accomplished in any suitable manner but we prefer to employ for this purpose an opening 14 formed in the jacket just below the jacket head 12 (see Fig. 1). This opening should not be so large as to permit circulation between the trapped water space and the space 13. We prefer to provide the flue 5 with means for increasing the temperature and transfer of heat at as low a point in the heater as possible. For this purpose we prefer to provide the interior of the flue 5 with a plurality of baffles 15 which may be of general fan shape (see Figure 2) and carried on a common central rod or stem 16.

If desired the shell 1 may be surrounded with lagging 17 of insulating material forming an insulating jacket between the shell 1 and an outer covering or shell 18. The heater may be provided with a sleeve 19 for the attachment of a thermostat control device.

In the operation of this heater it will be evident that although the opening 14 prevents any possibility of developing a higher pressure in the trap compartment 9 than in the service water compartment 13, nevertheless, the water in the trapped water compartment is substantially trapped, that is to say, the construction is such as to prevent free circulation between the trapped water compartment and the service compartment. Of course, if boiling occurs in the trapped water there is a tendency for a slight emission of water to occur at the opening 14 into the upper part of the chamber 13, but in this operation the baffles 15 cooperate to confine the highest temperature to a low level in the flue. In this way hot water rising in the jacket space 9 tends to have its temperature reduced before it reaches the opening 14. If any slight emission of water does occur from the jacket space 9, a replacement of this water would occur but such replacements are in such small quantities that they do not substantially increase the deposit of lime compounds in the trapped water space. The head 6 is provided with nipples 20 and 21, one of which would be an inlet and the other an outlet for the heated service water.

What we claim is:

1. In a water heater of the kind described, the combination of a shell having a service water chamber for the service water to be heated, a water inlet and a water outlet therefor, a fire box with a head in the lower part of the shell, a hot gas flue extending up from the said head for carrying up gases of combustion from the fire-box, a water head mounted in the shell above the fire-box head and cooperating with the fire-box head and the shell to form a trapped water compartment over the fire-box head, a tubular jacket surrounding the said flue and connected to the water head so as to form a trapped water jacket around the flue communicating with the said water compartment, a cover head secured to the said shell, and means located remote from the ebullition point adjacent said fire-box head, for maintaining pressure communication between the water jacket and the service water space within the said shell and operating to maintain equilibrium of pressures without circulation of water between the trapped water in the jacket and the service water being heated in the water space of the shell, said pressure communicating means being the sole means of communication between the water jacket and the service water compartment.

2. In a water heater of the kind described, the combination of a shell having a service water chamber for the service water to be heated, a water inlet and a water outlet therefore, a fire box with a fire-box head in the lower part of the shell, a hot gas flue extending up from the said head for carrying up gases of combustion from the fire-box, a water head mounted in the shell above the fire-box head and cooperating with the fire-box head and the shell to form a trapped water compartment over the fire-box head, a tubular jacket surrounding the said flue and connected to the water head so as to form a trapped water jacket around the flue communicating with the said water compartment, a cover head secured to the said shell with a restricted opening remote from the ebullition point at said fire-box head and adjacent the upper end of the tubular jacket and operating to maintain equilibrium of pressure without circulation between the water in the jacket and the water space of the shell, said pressure communicating means being the sole means of communication between the water jacket and the service water compartment.

3. In a water heater of the kind described, the combination of a shell having a service water chamber for the service water to be heated, a water inlet and a water outlet therefor, a fire-box with a fire-box head in the lower part of the shell, a hot gas flue extending up from the said head for carrying up gases of combustion from the fire-box, a water head mounted in the shell above the fire-box head and cooperating with the fire-box head and the shell to form a trapped water compartment over the fire-box head, a tubular jacket surrounding the said flue and connected to the water head so as to form a trapped water jacket around the flue communicating with the said water compartment, a cover head secured to the said shell, and means located remote from the ebullition point of said fire-box head, for maintaining pressure equalization between the water jacket and the service water space within the said shell and operating to maintain equilibrium of pressure without circulation between the trapped water in the jacket and the service water being heated in the water space of the shell, said pressure communicating means being the sole means of communication between the water jacket and the service water compartment, said heater head and said water head being of crowned form with the convex side disposed upwardly and having flanges at their edges secured to said shell.

4. In a water heater of the kind described, the combination of a shell having a service water chamber for the service water to be heated, a fire-box with a fire-box head in the lower part of the shell, a flue extending up from the said head for carrying up gases of combustion from the fire-box, a water head mounted in the shell above the fire-box head and cooperating with the fire-box head and the shell to form a trapped water compartment over the fire-box head, a tubular jacket surrounding the said flue and connected to the water head so as to form a trapped water jacket around the flue communicating with the said water compartment, a cover head secured to the said shell, and means located at a high level within the shell for maintaining communication between the water jacket and the service water space within the said shell and operating to maintain equilibrium of pressures between the trapped water in the jacket and the service water being heated in the water space of the shell, said heater head and said water head being of crowned form with the convex side disposed upwardly and having flanges at their edges secured to said shell, and baffles carried within the flue for checking the outward flow of the gases of combustion, thereby increasing the temperature toward the lower part of the flue and jacket, and reducing the temperature of the trapped water in the upper part of the jacket.

5. In a water heater of the kind described, the combination of a shell having a service water chamber for the service water to be heated, a water inlet and a water outlet therefor, a head in the lower part of the shell, a flue extending up from the head for carrying up a heating gas, a water head mounted in the shell above the first named head and cooperating with the first named head and the shell to form a trapped water compartment over the first named head, a tubular jacket surrounding the said flue and connected to the water head so as to form a trapped water jacket around the flue communicating with the said water compartment, a cover head secured to the said shell, and means located on the jacket for maintaining pressure communication between the water jacket and the service water space within the shell and operating to maintain equilibrium of pressures without circulation of water between the trapped water in the jacket and the service water being heated in the water compartment of the shell, said pressure communicating means being the sole means of communication between the water jacket and the service water compartment.

Signed at Los Angeles, California, this 19th day of January, 1931.

ORAN W. OTT.
ARTHUR J. SMITHERS.